US011921547B2

United States Patent
Cudak et al.

(10) Patent No.: US 11,921,547 B2
(45) Date of Patent: Mar. 5, 2024

(54) APPARATUS, METHODS, AND PROGRAM PRODUCTS FOR MODIFYING A SIZE AND/OR SHAPE OF A COMPUTING DISPLAY SCREEN

(71) Applicant: Lenovo (Singapore) PTE. LTD., New Tech Park (SG)

(72) Inventors: Gary D. Cudak, Wake Forest, NC (US); Nathan Peterson, Oxford, NC (US); John Petersen, Wake Forest, NC (US); Chekim Chhuor, Shanghai (CN)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 17/407,633

(22) Filed: Aug. 20, 2021

(65) Prior Publication Data
US 2023/0056152 A1    Feb. 23, 2023

(51) Int. Cl.
*G06F 1/16*     (2006.01)
*G06F 3/0488*   (2022.01)

(52) U.S. Cl.
CPC .......... *G06F 1/1652* (2013.01); *G06F 3/0488* (2013.01)

(58) Field of Classification Search
CPC .............................. G06F 1/1652; G06F 3/0488
See application file for complete search history.

(56) References Cited

U.S. PATENT DOCUMENTS

| | | | | |
|---|---|---|---|---|
| 6,297,838 B1* | 10/2001 | Chang | ................... | G06F 1/1626 345/184 |
| 2013/0038623 A1* | 2/2013 | Tezuka | ................... | A63F 13/42 345/589 |
| 2013/0227458 A1* | 8/2013 | Kim | ................. | G06F 3/0484 715/788 |
| 2014/0006988 A1* | 1/2014 | Yamamura | ............ | G06F 3/0482 715/765 |
| 2014/0320393 A1* | 10/2014 | Modarres | .............. | G06F 1/1641 345/156 |
| 2015/0192986 A1* | 7/2015 | Yang | ....................... | G09F 9/301 345/156 |
| 2016/0327988 A1* | 11/2016 | Erad | ..................... | G06F 1/1637 |

* cited by examiner

*Primary Examiner* — Seth A Silverman
(74) *Attorney, Agent, or Firm* — Kunzler Bean & Adamson

(57) ABSTRACT

Apparatus, methods, and program products for dynamically shaping are computing display screen are disclosed. One apparatus includes a processor and a memory that stores code executable by the processor. The code is executable by the processor to receive an input from a user, determine if the input is a predefined input, and modify the size and/or shape of the computing display screen in response to the input being the predefined input. Methods and computer program products that perform the operations and/or functions of the apparatus are also disclosed.

20 Claims, 10 Drawing Sheets

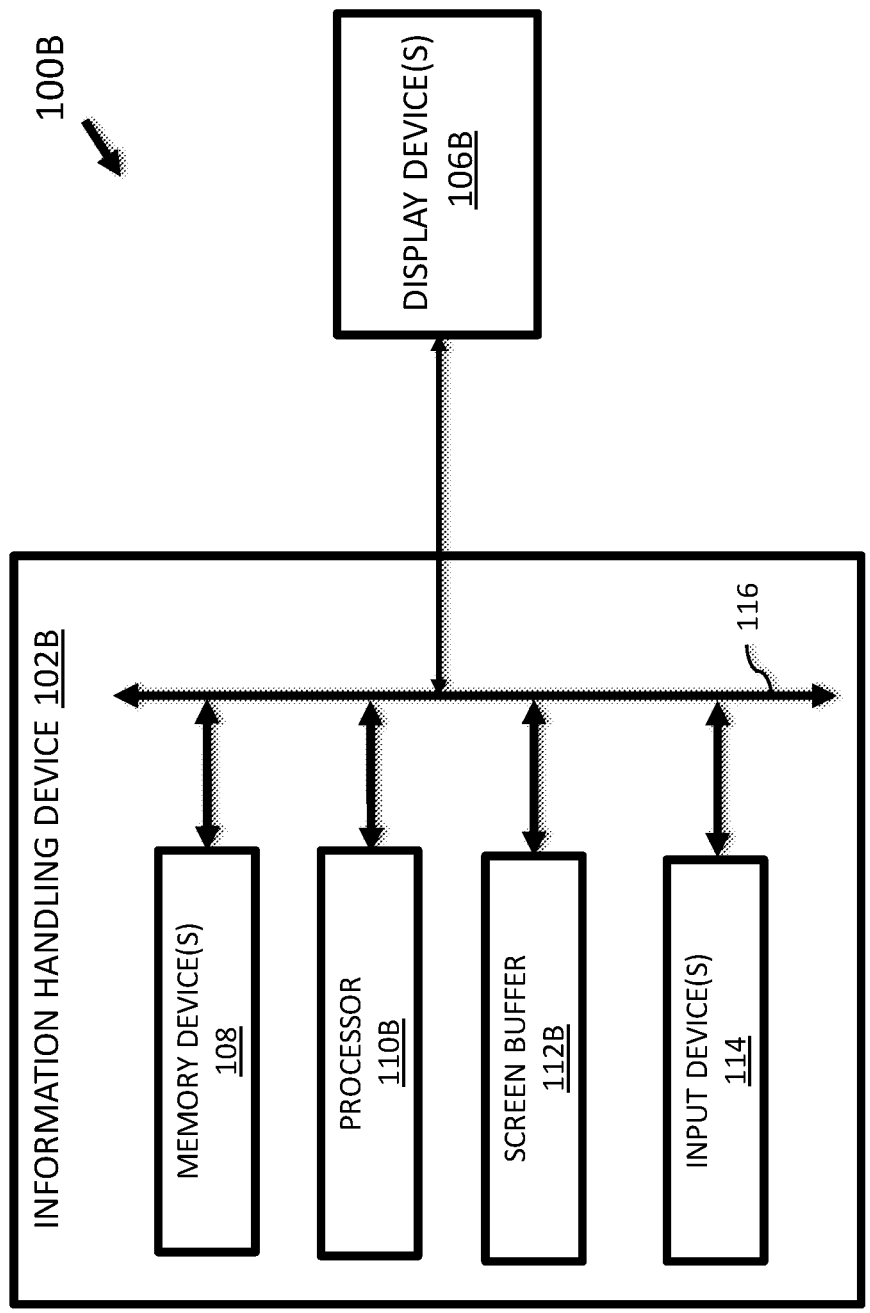

APPARATUS, METHODS, AND PROGRAM PRODUCTS FOR MODIFYING A SIZE AND/OR SHAPE OF A COMPUTING DISPLAY SCREEN

FIELD

The subject matter disclosed herein relates to computing displays and more particularly relates to apparatus, methods, and program products that can modify a size and/or shape of a computing display screen.

DESCRIPTION OF THE RELATED ART

Some users utilize multiple computing displays when interacting with an information handling device (e.g., a desktop computer, a laptop computer, etc.). The use of multiple computing displays may be desired because the amount of content being displayed at various points in time may exceed the real estate available on a single computing display screen and/or keeping one or more applications displayed on a computing display screen at certain sizes may cause eye strain for some users.

BRIEF SUMMARY

Apparatus for modifying a size and/or shape of a computing display screen are disclosed. One apparatus includes a processor and a memory that stores code executable by the processor. The code is executable by the processor to receive an input from a user, determine if the input is a predefined input, and modify one of the size or the shape of the computing display screen in response to the input being the predefined input.

Also disclosed are methods for modifying a size and/or shape of a computing display screen. One method includes receiving, by a processor couplable to a computing display screen including a size and a shape, an input from a user, determining if the input is a predefined input, and modifying one of the size or the shape of the computing display screen in response to the input being the predefined input.

Program products including a computer-readable storage medium that stores code executable by a processor for modifying a size and/or shape of a computing display screen are further disclosed herein. The processor is couplable to a computing display screen including a size and a shape and the executable code, in certain embodiments, includes code to perform receiving an input from a user, determining if the input is a predefined input, and modifying one of the size or the shape of the computing display screen in response to the input being the predefined input.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIGS. 1A through 1C are schematic block diagrams of various embodiments of a computing system (and/or computing device) that can modify a size and/or a shape of a computing display screen;

DETAILED DESCRIPTION

Figure 1A:
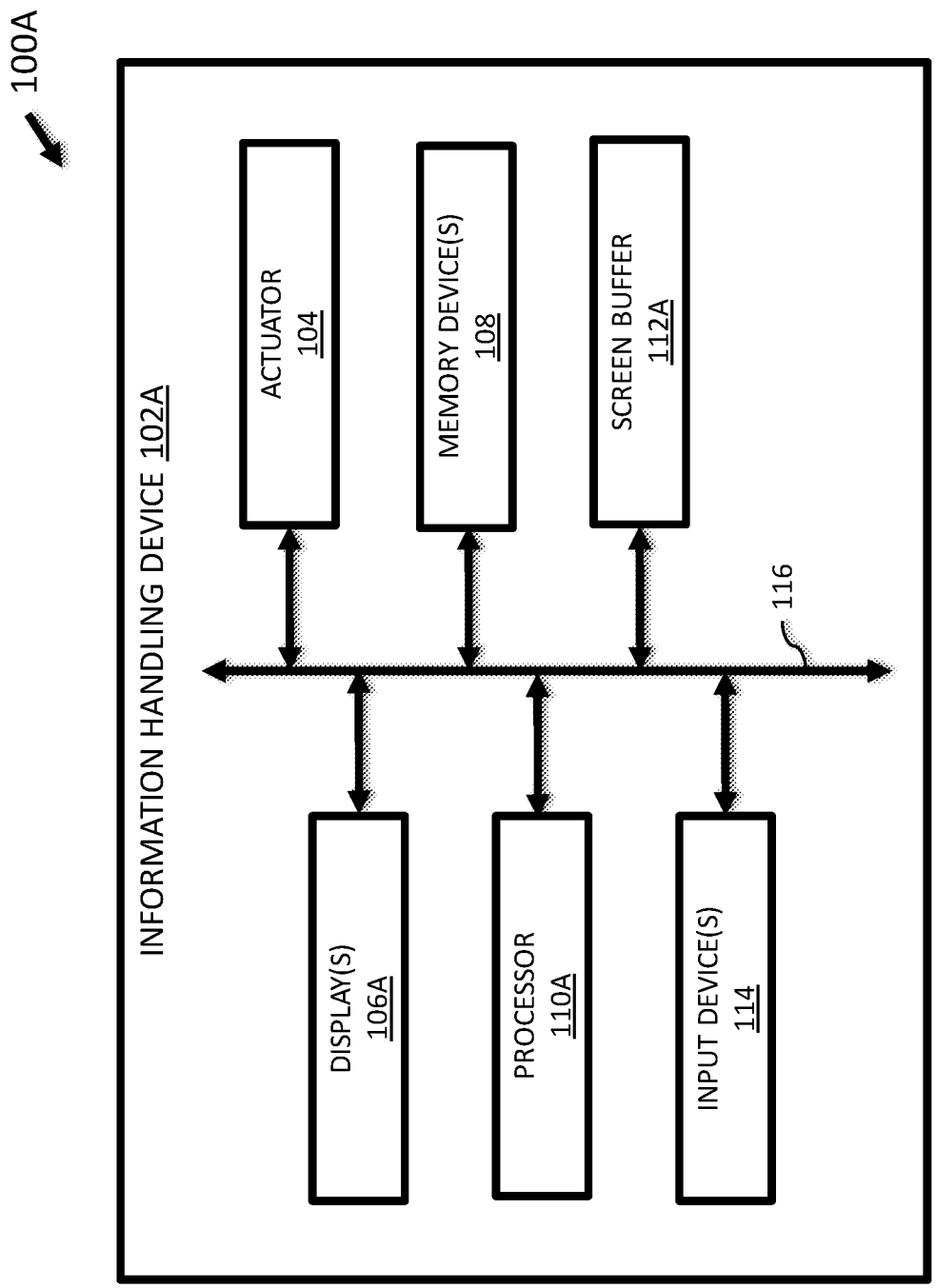

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a circuit, module, or system. Furthermore, embodiments may take the form of a program product embodied in one or more computer-readable storage devices storing machine readable code, computer-readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together and may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer-readable storage devices. Where a module or portions of a module are implemented in software, the software portions are stored on one or more computer-readable storage devices.

Any combination of one or more computer-readable media may be utilized. The computer-readable medium/media may include one or more computer-readable storage media. The computer-readable storage medium/media may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (e.g., a non-exhaustive and/or non-limiting list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the C programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to one embodiment, an embodiment, or similar language means that a particular feature, structure, or characteristic described in connection with the embodiment is included in at least one embodiment. Thus, appearances of the phrases in one embodiment, in an embodiment, and similar language throughout this specification may, but do not necessarily, all refer to the same embodiment, but mean one or more but not all embodiments unless expressly specified otherwise. The terms including, comprising, having, and variations thereof mean including but not limited to, unless expressly specified otherwise. An enumerated listing of items does not imply that any or all of the items are mutually exclusive, unless expressly specified otherwise. The terms, "a," "an," and "the," also refer to one or more unless expressly specified otherwise.

In addition, as used herein, the term, "set," can mean one or more, unless expressly specified otherwise. The term, "sets," can mean multiples of or a plurality of one or mores, ones or more, and/or ones or mores consistent with set theory, unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatus, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1A is a schematic block diagram of one embodiment of a computing system 100A (and/or computing device) that can modify a size and/or a shape of a computing display screen. The computing system 100A includes, among other components, an information handling device 102A (e.g., a laptop computer, a personal digital assistant (PDA), a tablet computer, a smart phone, a cellular telephone, a smart television (e.g., televisions connected to the Internet), a wearable, an Internet of Things (IoT) device, a game console, a vehicle on-board computer, a streaming device, a smart device, and a digital assistant, etc., among other information handling devices that include an internal display device that are possible and contemplated herein). At least in the illustrated embodiment, the information handling device 102A includes, among other components, an actuator 104, a set of one or more display devices 106A, a set of memory devices 108, a processor 110A, a screen buffer 112A, and a set of one or more input devices 114 coupled to and/or in communication with one another via a bus 116 (e.g., a wired and/or wireless bus).

An actuator 104 may include any suitable hardware and/or software that can modify/change the size and/or shape of a flexible screen 202A (see, FIG. 2A) of the display device 106A in response to receiving commands and/or instructions from the processor 108. In various embodiments, the actuator 202A is configured to modify/change the size and/or shape of the flexible screen 202A by applying an expansion force and/or a contraction force to one or more sections, one or more sides, and/or one or more portions of the perimeter of the flexible screen 202, as discussed below. In various embodiments, the actuator 104 is configured to modify the size (and/or one or more dimensions) and/or shape of the flexible screen 202A in response to receiving a set of one or more commands and/or a set of one or more instructions from the processor 110 (and/or a display modification module 306 or 406 (see, FIGS. 3 and 4)) commanding/instructing the actuator 104 to modify the size (and/or one or more dimensions) and/or shape of the flexible screen 202, as discussed elsewhere herein.

A display device 106A may include any suitable hardware and/or software that can display digital information (e.g., digital data) thereon. In various embodiments, the display device 106A includes an internal display device or other similar device that can display data thereon that forms a portion of the information handling device 102A. The display device 106A, in various embodiments, is configured to receive commands and/or instructions from the processor 110 for displaying data thereon.

Figure 2A:
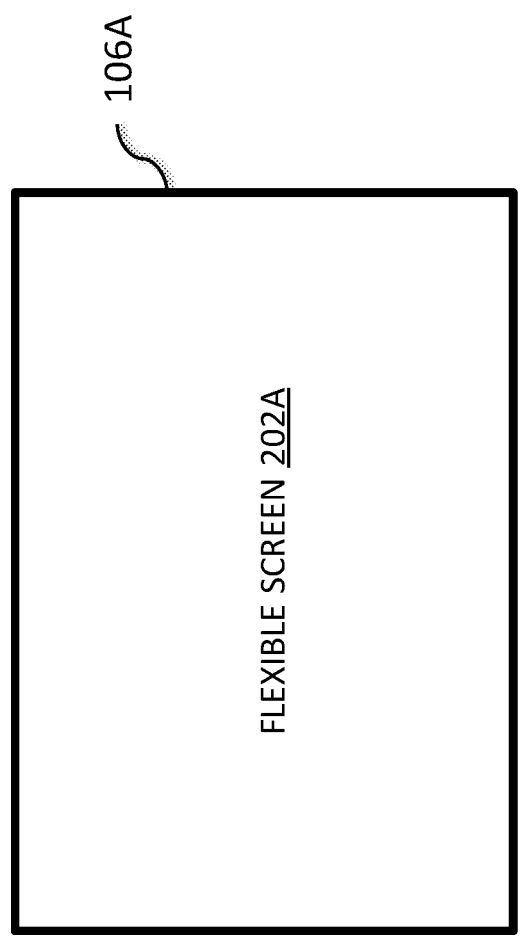
FIGS. 2A and 2B are schematic block diagrams of various embodiments of a display device included in the computing systems (and/or computing devices) of FIGS. 1A through 1C.

With reference to FIG. 2A, one embodiment of a display device 106A is shown. At least in the illustrated embodiment, the display device 106A is an internal display and includes, among other components, a flexible screen 202A coupled to and in communication with the actuator 104. In various embodiments, the actuator 104 is configured to receive commands and/or instructions from the processor 110A that enable and/or allow the actuator 104 to dynamically modify (change) the size and/or shape of the flexible screen 202A.

A flexible screen 202A may include and/or be formed of any suitable material capable of having its size and/or shape modified. In various embodiments, the flexible screen 202A includes a set of pixels that are capable of flexing and/or expanding in response to the actuator 104 applying a force to the flexible screen 202A to modify (change) the size and/or shape of the flexible screen 202A.

The flexible screen 202A may include any suitable size (dimensions) and/or shape that is known or developed in the future capable of allowing the information handling device 102A to perform its function(s) and/or the display device 106A to perform its function(s). In some embodiments, the flexible screen 202A includes a polygonal shape (e.g., a triangle, a quadrilateral (a square, a rectangle, a rhombus, etc.), a pentagon, a hexagon, a heptagon, an octagon, a nonagon, a decagon, etc.) and/or a circular shape (e.g., a circle, an oval, etc.), etc., among other regular and/or irregular shapes that are possible and contemplated herein.

In some embodiments, the flexible screen 202A is configured to expand (increase) and/or contract (decrease) its size in response to a corresponding expansion and/or contraction force being applied to the flexible screen 202A from the actuator 104. That is, the flexible screen 202A is configured to expand or increase its size in response to an expansion force being applied to one or more sections, sides, and/or along the perimeter of the flexible screen 202A. In some embodiments, the flexible screen 202A is configured to increase its size and maintain its shape in response to the same amount of expansion force being applied to each section, side, and/or along the entire perimeter of the flexible screen 202.

Similarly, the flexible screen 202A is configured to contract or decrease its size in response to a contraction force being applied to one or more sections, sides, and/or along the perimeter of the flexible screen 202. In some embodiments, the flexible screen 202A is configured to decrease its size and maintain its shape in response to the same amount of contraction force being applied to each section, side, and/or along the entire perimeter of the flexible screen 202.

In additional or alternative embodiments, the flexible screen 202A is configured to modify/change its shape in response to expansion/contraction force(s) being applied to the flexible screen 202A from the actuator 104. That is, the flexible screen 202A is configured to modify its shape in response to an expansion force and/or a contraction force being applied to one or more sections, one or more sides, and/or to one or more portions of the perimeter of the flexible screen 202. For example, a square-shaped flexible screen 202A can be modified to include a rectangular shape by applying an expansion force to two opposing sides and not applying any force to the other two opposing sides, applying a contraction force to two opposing sides and not applying any force to the other two opposing sides, or applying an expansion force to two opposing sides and applying a contraction force to the other two opposing sides. In another non-limiting example, a rectangular-shaped flexible screen 202A can be modified to include a square shape by applying an expansion force to the two opposing sides with the shorter lengths and not applying any force to the two opposing sides with the longer lengths until all four sides include the same length, applying a contraction force to the two opposing sides with the longer lengths and not applying any force to the two opposing sides with the shorter lengths until all four sides include the same length, or applying an expansion force to the two opposing sides with the shorter lengths and applying a contraction force to the two opposing sides with the longer lengths until all four sides include the same length. In these non-limiting examples, the different shapes may also result in the flexible screen 202A including a larger or smaller size and/or one or more larger or smaller dimensions.

In various embodiments, the flexible screen 202A is configured to increase/decrease its size and maintain its shape in response to the same amount of expansion/contraction force being applied to each section, side, and/or along the entire perimeter of the flexible screen 202. That is, the flexible screen 202A is configured to expand or increase its size while maintaining its shape in response to the same amount of expansion force being applied to each section, side, and/or along the entire perimeter of the flexible screen 202. Similarly, the flexible screen 202A is configured to contract or decrease its size while maintaining its shape in response to a contraction force being applied to one or more sections, sides, and/or along the perimeter of the flexible screen 202A (and/or display device 104A).

In additional or alternative embodiments, the flexible screen 202A is configured to change its size and shape by increasing and/or decreasing one or more sections, sides, and/or along different portions of the perimeter of the flexible screen 202. For example, a circular-shaped flexible screen 202A can be modified into an oval-shaped flexible screen 202A by applying differing amounts of expansion force along different portions of the perimeter if the flexible screen 202. Similarly, an oval-shaped flexible screen 202A can be modified into a circular-shaped flexible screen 202A by applying differing amounts of expansion force along different portions of the perimeter if the flexible screen 202. In these non-limiting examples, the different shapes may result in the flexible screen 202A including a larger or smaller size and/or one or more larger or smaller dimensions depending on the amount of applied expansion and/or contraction force to the section(s), side(s), and/or portion(s) of the perimeter and/or the location where the expansion and/or contraction force is applied.

In certain embodiments, the flexible screen 202A includes a touchscreen. Here, the processor 110A is configured to receive touch inputs from the user (e.g., user inputs) via the flexible screen 202.

Referring again to FIG. 1A, a set of memory devices 108 may include any suitable quantity of memory devices 108. Further, a memory device 108 may include any suitable type of device and/or system that is known or developed in the future that can store computer-useable and/or computer-readable code. In various embodiments, a memory device 108 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., processor 110A (and processor 110B (see, FIG. 1B) and processor 110C (see, FIG. 1C)).

A memory device 108, in some embodiments, includes volatile computer storage media. For example, a memory device 108 may include random access memory (RAM), including dynamic RAM (DRAM), synchronous dynamic RAM (SDRAM), and/or static RAM (SRAM). In other embodiments, a memory device 108 includes non-volatile computer storage media. For example, a memory device 108 may include a hard disk drive, a flash memory, and/or any other suitable non-volatile computer storage device that is known or developed in the future. In various embodiments, a memory device 108 includes both volatile and non-volatile computer storage media. In additional embodiments, a memory device 108 also stores program code and/or related data, such as an operating system (OS) and/or other controller algorithms operating on an information handling device (e.g., information handling devices 102A, 102B, and 102C).

Figure 3:
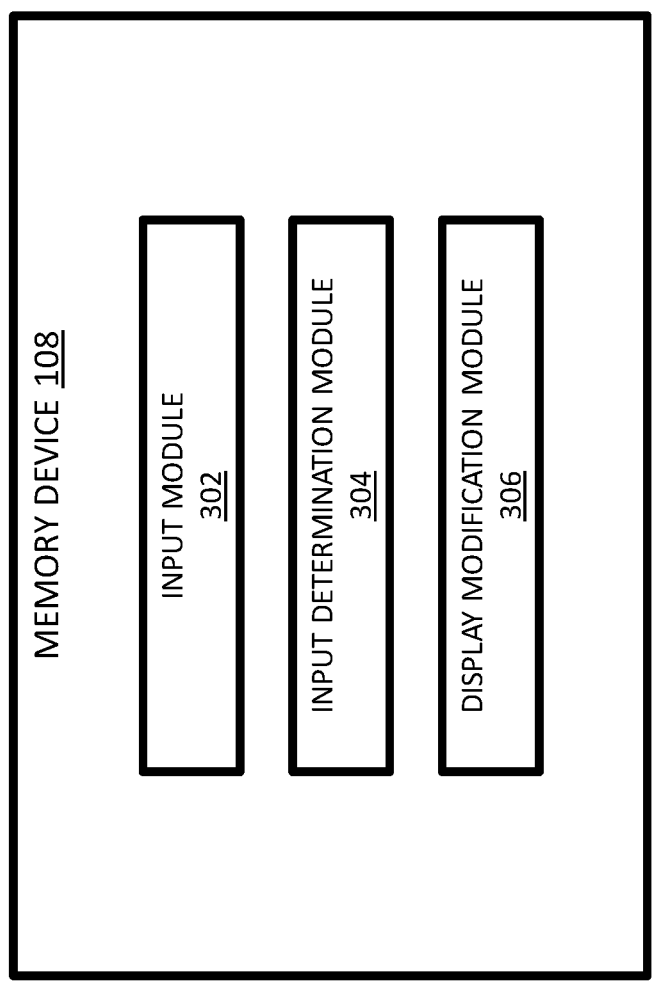
FIG. 3 is a schematic block diagram of one embodiment of a memory device included in the computing systems (and/or computing devices) of FIGS. 1A through 1C.

With reference now to FIG. 3, FIG. 3 is a schematic block diagram of one embodiment of a memory device 108. At least in the illustrated embodiment, the memory device 108 includes, among other components, an input module 302, an input determination module 304, and a display modification module 306 that are each configured to operate/function in conjunction with one another when executed by the processor 110A (and processor(s) 100B and 100C).

Figure 1C:
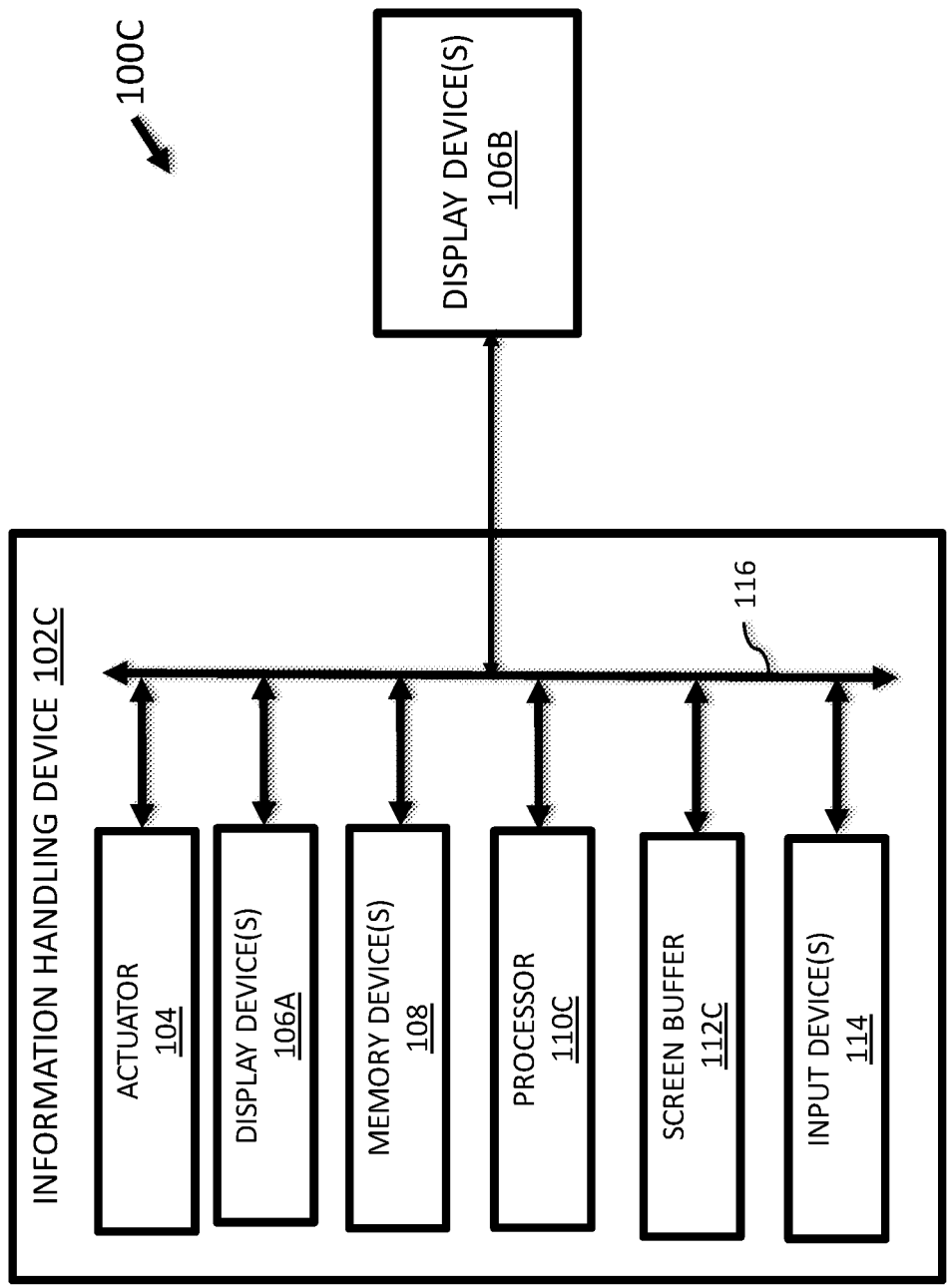

An input module 302 may include any suitable hardware and/or software that can receive a set of one or more inputs from a user via one or more input device(s) 114 (see, FIGS. 1A, 1B, and 1C). In some embodiments, the input module 302 can form a portion of an input/output (I/O) module.

A user input may be any suitable type of user input and/or quantity of user inputs that is/are known or developed in the future. In various embodiments, a set of user inputs can include one or more of a set of keyed inputs (e.g., one or more keystrokes on a keyboard, etc.), a set of mouse inputs (e.g., a cursor movement and/or a click of a mouse, etc.), a set of visual inputs (e.g., a gesture detected by a camera, a distance a user is away from the flexible screen 202A, etc.), a set of auditory inputs (e.g., a voice command on a microphone, etc.), a set of touch/tactile inputs (e.g., a touch on a touchscreen or a touchpad, etc.), and/or a thermal input (e.g., thermally detecting a distance a user is away from the flexible screen 202A, etc.), etc., among other types of user inputs that are possible and contemplated herein.

In some embodiments, the user input corresponds to the user using one or more input devices 114 to open an application including a window size. In additional or alternative embodiments, the user input corresponds to the user using one or more input devices 114 to place an application window at a particular and/or predetermined location on the flexible screen 202A and/or moving the application window, which can be movement in general or moving the application window greater than a predetermined distance on the flexible screen 202A, which can be any suitable distance.

In certain embodiments, a user input can be based on a distance the user is away from the flexible screen 202A, as detected by, for example, a camera and/or a thermal imaging/detection device. In various embodiments, the input module 302 is configured to transmit the received the user inputs to the input determination module 304.

An input determination module 304 may include any suitable hardware and/or software that can receive the user inputs from the input module 302. The input determination module 304 may further include any suitable hardware and/or software that can determine whether a user input is a predefined user input.

In various embodiments, the input determination module 304 is configured to store a set of one or more predefined user inputs for comparison to sets of user inputs received from the input module 302. A predefined user input may include any suitable type of user input and/or quantity of user inputs that is/are known or developed in the future that can be associated with and/or be made to correspond to a set of one or more commands and/or a set of one or more instructions to modify the size and/or shape of a flexible screen 202.

In various embodiments, a predefined user input includes a particular and/or predetermined set of keyed inputs, mouse inputs, visual inputs, auditory inputs, and/or touch/tactile inputs, etc. For example, a predefined user input can include the user pressing the Alt key on a keyboard and using a mouse input (Alt+cursor movement) to move a cursor on the flexible screen 202A, among other examples of keyed inputs, mouse inputs, visual inputs, auditory inputs, and touch/tactile inputs, and combinations thereof that are possible and contemplated herein. In additional or alternative embodiments, a predefined user input can include a set of keyed inputs, mouse inputs, visual inputs, auditory inputs, and/or touch/tactile inputs, etc., performed in a particular order, at a particular time, and/or with a particular degree of intensity, among other criterion/criteria that are possible and contemplated herein.

In certain embodiments, the predefined user input is based on an object size and/or window size (e.g., an application window). For example, a predefined user input can include the user using one or more input devices 114 to open an application on the flexible screen 202A that includes a window size (or object size) that is greater than, less than, or equal to a predetermined size, which can any suitable size. In another non-limiting example, the predefined user input can include the user using one or more input devices 116 to increase or decrease the size of an application window and/or object being displayed on the flexible screen 202A greater than, less than, or equal to a predetermined amount, which can any suitable increase or decrease in amount and/or any suitable resulting window and/or object size, which can be any suitable predetermined resulting window and/or object size, whether the increased/decreased amount and/or resulting window/object size being a maximum and/or minimum amount.

In additional or alternative embodiments, a predefined user input can be based on moving an object and/or application window. For example, the predefined user input can include the user using one or more input devices 116 to move an object and/or application window being displayed on the flexible screen 202A, which movement can be movement in general, movement to a particular/predetermined location, and/or movement of the object and/or application window greater than a threshold distance on the flexible screen 202A, which can be any suitable distance, among other movements of a that are possible and contemplated herein.

In further additional or alternative embodiments, a predefined user input can be based on the distance the user is away from the flexible screen 202A. For example, a predefined user input can be a threshold distance between the user and the flexible screen 202A detected by one or more input devices 114 (e.g., a camera and/or thermal imaging/detection device, etc.), which threshold distance can be a particular maximum distance, minimum distance, and/or a range of maximum and/or minimum distances.

In certain embodiments, a predefined user input can be based on the content and/or the type of data being displayed on the flexible screen 202A. For example, a predefined user input can include the user utilizing one or more input devices 116 to start an application with a particular type of format (e.g., video playback, video conferencing format, and social media format, data streaming, etc., among other format types that are possible and contemplated herein).

In various embodiments, the input determination module 304 is configured to compare a set of one or more user inputs received from the input module 302 to the stored predefined user inputs to determine a match. In response to the set of one or more user inputs not matching or failing to match a predefined user input, the input determination module 304 is configured to ignore the received user input(s) and/or do nothing in response thereto and continue to receive user inputs from the input module 302. In response to the set of one or more user inputs matching a predefined user input, the input determination module 304 is configured to transmit the predefined user input to the display modification module 306 so that the display modification module 306 can calculate and perform a modification to the size and/or shape of the flexible screen 202A.

A display modification module 306 may include any suitable hardware and/or software that can receive predefined user inputs from the input determination module 304. The display modification module 306 may further include any suitable hardware and/or software that can identify a set of one or more commands and/or a set of one or more instructions to calculate a modification to the flexible screen 202A and, accordingly, modify the size and/or shape of the flexible screen 202A associated with and/or corresponding to the predefined user input.

In various embodiments, the display modification module 306 is configured to store a set of one or more commands and/or a set of one or more instructions for modifying the size and/or shape of the flexible screen 202A associated with and/or corresponding to the predefined user input. The command(s) and/or instruction(s) may include any suitable command/instruction that is known or developed in the future capable of determining which modification(s) to the size and/or shape of the flexible screen 202A and controlling a set of one or more operations and/or functions of the actuator 104 for modifying the size and/or shape of the flexible screen 202A associated with and/or corresponding to a predefined user input.

In some embodiments, a set of one or more commands and/or a set of one or more instructions may command/instruct the actuator 104 to increase or decrease the size (and/or one or more dimensions) of the flexible screen 202A based on the particular predefined user input identified/determined by the input determination module 304. In other embodiments, a set of one or more commands and/or a set of one or more instructions may command/instruct the actuator 104 to modify the shape of the flexible screen 202A based on the particular predefined user input identified/determined by the input determination module 304. In yet other embodiments, a set of one or more commands and/or a set of one or more instructions may command/instruct the actuator 104 to modify the size (and/or one or more dimensions) and the shape of the flexible screen 202A based on the particular predefined user input identified/determined by the input determination module 304.

The operations of the display modification module 306, in various embodiments, include determining a current size and/or shape of the flexible screen 202A in response to receiving a predefined user input and/or calculating/determining the modification(s) associated with and/or corresponding to a received predefined user input. Further, the display modification module 306 is configured to capture/determine the dimensions and/or placement of the object and/or application window on the flexible screen 202A corresponding to the predefined user input. The display modification module 306 is configured to then compare the current size and/or placement of the object and/or application window on the flexible screen 202A to the current screen boundaries, size, and/or one or more dimensions of the flexible screen 202A to determine/identify which modification(s) to the size(s) of one or more sections, sides, and/or portions of a perimeter of the flexible screen 202A and/or which modifications to the shape of the flexible screen 202A correspond to and/or are associated with the predefined user input.

Upon determining/identifying which modification(s) to the size and/or shape of the flexible screen 202A corresponding to the predefined user input, the display modification module 306 is configured to calculate/determine where (e.g., which section(s), side(s), and/or portion(s) of the perimeter) to increase and/or decrease the flexible screen 202A to account for the modification(s) to the flexible screen 202A needed to resize and/or reshape the current size (dimensions) and/or shape of the flexible screen 202A so that the new size and/or shape of the flexible screen 202A corresponds to a desired size (desired dimension(s)) and/or desired shape of the flexible screen 202A corresponding to the predefined user input associated with and/or corresponding to the object and/or application window being displayed on the flexible screen 202A. In response to determining/identifying which section(s), side(s), and/or portion(s) of the perimeter of the flexible screen 202A are to be increased and/or decreased so that the flexible screen 202A includes the desired size (dimension(s)) and/or shape, the display modification module 306 is configured to transmit a set of one or more commands and/or a set of one or more instructions to the actuator 104 commanding/instructing the actuator 104 to increase and/or decrease the corresponding section(s), side (s), and/or portion(s) of the perimeter of the flexible screen 202A so that the flexible screen 202A includes the desired size (desired dimension(s)) and/or desired shape.

In various embodiments, the input module 302, the input determination module 304, and/or the display modification module 306 are configured to automatedly and/or automatically perform their respective operations and/or functions. In certain embodiments, functions and/or operation of the input module 302, the input determination module 304, and/or the display modification module 306 are performed in real-time and/or on-the-fly.

Referring back to FIGS. 1A, a processor 110A may include any suitable non-volatile/persistent hardware and/or software configured to perform and/or facilitate performing functions and/or operations for dynamically modifying a size and/or shape of a computing display screen (e.g., flexible screen 202A and flexible screen 202B (see, FIG. 2B)). In various embodiments, the processor 110A includes hardware and/or software for executing instructions in one or more modules and/or applications that can perform and/or facilitate performing functions and/or operations for dynamically modifying a size and/or shape of a computing display screen. The modules and/or applications executed by the processor 110A for dynamically modifying a size and/or shape of a computing display screen can be stored on and executed from a memory device 108 and/or from the processor 110A.

The processor 110A included in the information handling device 100A may be coupled to and/or couplable to an actuator 104 and is capable of transmitting a set of one or more commands and/or instructions to control the actuator 104 both when actually coupled to the actuator 104 and when couplable to (e.g., is capable of being coupled to and is not actually and/or currently coupled to) the actuator 104. As such, the term, "couplable," can include the processor 110A included in the information handling device 102A being actually coupled to the actuator 104 and/or is capable of being coupled to the actuator 104 but is not actually/currently coupled to the actuator 104.

Figure 4:
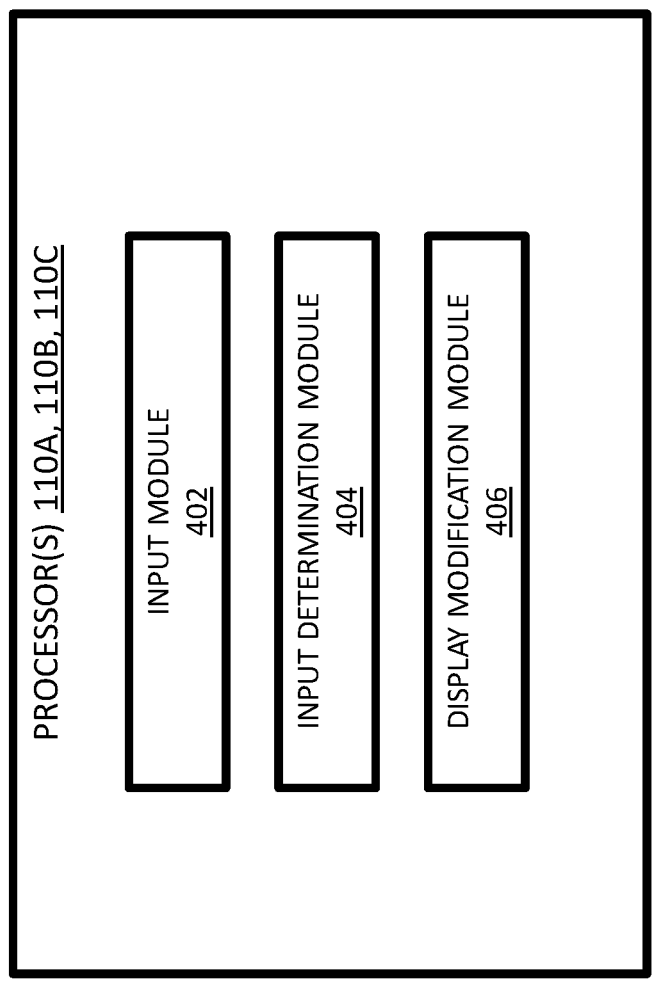
FIG. 4 is a schematic block diagram of one embodiment of a processor device included in the computing systems (and/or computing devices) of FIGS. 1A through 1C.

With reference to FIG. 4, FIG. 4 is a schematic block diagram of one embodiment of a processor 110A (and processor(s) 110B and 110C). At least in the illustrated embodiment, the processor 110A includes, among other components, an input module 402, an input determination module 404, and a display modification module 406 similar to the various embodiments of the input module 302, the input determination module 304, and the display modification module 306 discussed above with reference to FIG. 3.

In FIG. 1A, a screen buffer 112A may include any suitable hardware and/or software capable of being used by an application to represent the content to be shown on the flexible screen 202A. In various embodiments, the screen buffer 112A is configured to correspondingly modify the data and/or content being displayed on the flexible screen 202A of an internal display device 106A in response to the size and/or shape of the flexible screen 202A of the internal display device 106A being modified.

For example, the screen buffer 112A is configured to increase the size of one or more items (e.g., an application, a video, a picture, etc.) being displayed on the flexible screen 202A in response to the size of the flexible screen 202A being increased. Similarly, the screen buffer 112A is configured to decrease the size of one or more items being displayed on the flexible screen 202A in response to the size of the flexible screen 202A being decreased.

In another non-limiting example, the screen buffer 112A may be configured to increase the size of one or more items being displayed on the flexible screen 202A, as needed to clearly show the item(s), in response to the shape of the flexible screen 202A being modified. Similarly, the screen buffer 112A may be configured to decrease the size of the one or more items being displayed on the flexible screen 202A, as needed to clearly show the item(s), in response to the shape of the flexible screen 202A being modified.

In still another non-limiting example, the screen buffer 112A may be configured to increase the size of one or more items being displayed on the flexible screen 202A in response to the size of the flexible screen 202A being increased and shape of the flexible screen 202A being modified. Similarly, the screen buffer 112A may be configured to decrease the size of one or more items being displayed on the flexible screen 202A in response to the size of the flexible screen 202A being decreased and shape of the flexible screen 202A being modified.

A set of input devices 114 may include any suitable type of device that is known or developed in the future capable of receiving an input from a user. Further, the set of input devices 114 may include any suitable quantity of input devices 114.

Example input devices 114 include but are not limited to, a keyboard, a mouse, a microphone, a camera, a touchscreen, a joystick, a trackball, a touchpad, and a stylus, etc., among other input devices 114 that are possible and contemplated herein.

In various embodiments, one or more input devices 114 are coupled to and/or in communication with the processor 110, the input module 302 and/or the input module 402. The input device(s) 114 is/are configured to receive a user input from the user and, in response to receiving the user input, transmit a signal representing the user input to the processor 110, the input module 302 and/or the input module 402 for processing by the processor 110, the input module 302 and/or the input module 402, as discussed elsewhere herein.

FIG. 1B is a schematic block diagram of another embodiment of a computing system 100B (and/or computing network) that can modify a size and/or a shape of a computing display screen. At least in the illustrated embodiment, the computing system 100B includes, among other components, an information handling device 102B (e.g., a desktop computer, a set-top box, a game console, a vehicle on-board computer, and a streaming device, etc., among other information handling devices that utilize an external display device that are possible and contemplated herein) coupled to and/or in communication with a set of one or more display devices 106B (e.g., one or more external display devices).

As shown in the embodiment of FIG. 1B, the information handling device 102B includes, among other components, a set of memory devices 108, a processor 110B, a screen buffer 112B, and a set of one or more input devices 114 coupled to and/or in communication with one another and the display device(s) 104B via a bus 116. The various embodiments of the set of memory devices 108, the processor 110B, the screen buffer 112B, the set of one or more input devices 114, and/or the bus 116 included on the information handling device 102B may include any suitable hardware and/or software and perform a set of one or more operations/functions similar to the various respective embodiments of the set of memory devices 108, the processor 110A, the screen buffer 112A, the set of one or more input devices 114, and the bus 116 discussed above with reference to FIG. 1A.

Figure 2B:
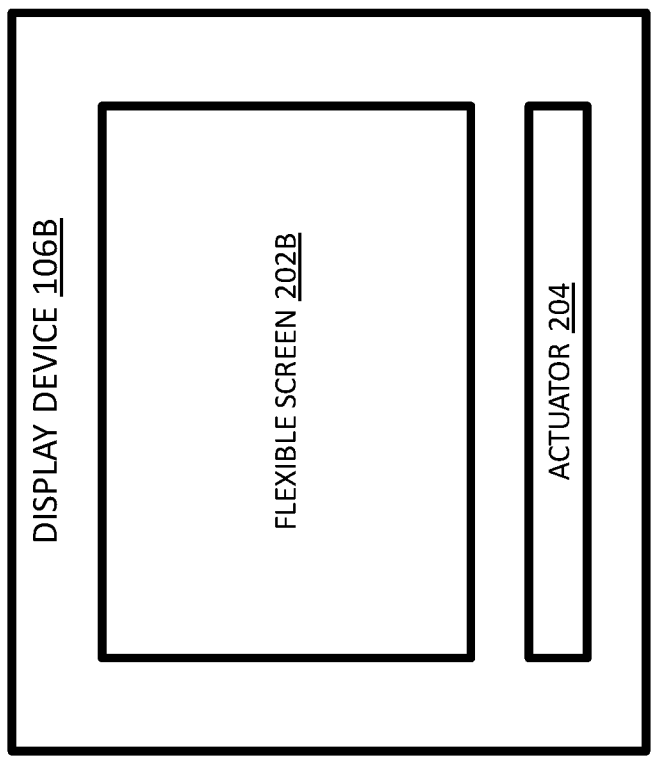

With reference to FIG. 2B, one embodiment of a display device 106B is shown. At least in the illustrated embodiment, the display device 106B is an external display device and includes, among other components, a flexible screen 202B and an actuator 204 coupled to and/or in communication with one another.

In various embodiments, the actuator 204 is configured to receive commands and/or instructions from the processor 110B that enable and/or allow the actuator 204 to dynamically modify (change) the size and/or shape of the flexible screen 202B similar to the embodiments of the actuator 104 and the display device 106A discussed above with reference to FIGS. 1A and 2A. That is, various embodiments of the flexible screen 202B of the display device 106B are similar to the various embodiments of the flexible screen 202A of the display device 106A, as discussed above with reference to FIGS. 1A and 2A, except that the flexible screen 202B of the display device 106B is a computing display screen of an external display device 106B. In addition, various embodiments of the actuator 204 are similar to the various embodiments of the actuator 104, as discussed above with reference to FIG. 1A, except that the actuator 204 is located on the external display device 106B and receives commands/instructions and/or is controlled by a processor (e.g., processor 110B) located on the information handling device 102B.

The processor 110B included in the information handling device 100B may be coupled to and/or couplable to each respective actuator 204 included in the display device(s) 106B and/or to each corresponding display device 106B. That is, processor 110B included in the information handling device 100B is capable of transmitting a set of one or more commands and/or instructions to control an actuator 204 both when actually coupled to the actuator 204 and/or the corresponding display device 106B and when couplable to (e.g., is cable of being coupled to and is not actually/currently coupled to) the actuator 204 and/or the corresponding display device 106B. As such, the term, "couplable," can include the processor 110B included in the information handling device 100B being actually coupled to the actuator 204 and/or the corresponding display device 106B and/or is capable of being coupled to the actuator 204 and/or the corresponding display device 106B but is not actually/currently coupled to the actuator 204 and/or the corresponding display device 106B.

As discussed above, the various embodiments of the screen buffer 112B included in the information handling device 100B include hardware and/or software and perform a set of one or more operations/functions similar to the various embodiments of the screen buffer 112A included in the information handling device 100A. A difference between the screen buffer 112B included in the information handling device 100B and the screen buffer 112A included in the information handling device 100A is that the screen buffer 112B included in the information handling device 100B is configured to modify the data and/or content being displayed on the flexible screen 202B of an external display device 106B in response to the size and/or shape of the flexible screen 202B on the external display device 106B being modified, whereas the screen buffer 112A included in the information handling device 100A is configured to modify the data and/or content being displayed on the flexible screen 202A of an internal display device 106A in response to the size and/or shape of the flexible screen 202A on the internal display device 106A being modified.

FIG. 1C is a schematic block diagram of yet another embodiment of a computing system 100C (and/or computing network) that can modify a size and/or a shape of a computing display screen. At least in the illustrated embodiment, the computing system 100C includes, among other components, an information handling device 102C (e.g., a laptop computer, a PDA, a tablet computer, a smart phone, a cellular telephone, a smart television, a wearable, an IoT device, a game console, a vehicle on-board computer, a streaming device, a smart device, and a digital assistant, etc., among other information handling devices that include an internal display device that are possible and contemplated herein) coupled to and/or in communication with a set of one or more display devices 104B (e.g., one or more external display devices).

At least in the illustrated embodiment, the information handling device 102C includes, among other components, an actuator 104, a set of one or more display devices 106A, a set of memory devices 108, a processor 110C, a screen buffer 112C, and a set of one or more input devices 114 coupled to and/or in communication with one another and the display device(s) 104B via a bus 116. The various embodiments of the actuator 104, the set of display devices 106A, the set of memory devices 108, the processor 110C, the screen buffer 112C, the set of one or more input devices 114, and/or the bus 116 included on the information handling device 102C may include any suitable hardware and/or software and perform a set of one or more operations/functions similar to the various respective embodiments of the actuator 104, the set of display devices 106A, the set of memory devices 108, the processors 110A and 110B, the screen buffers 112A and 112B, the set of one or more input devices 114, and the bus 116 discussed above with reference to FIGS. 1A and 1B.

The various embodiments of the display device(s) 106B included in the computing system 100C may include any suitable hardware and/or software and perform a set of one or more operations/functions similar to the various respective embodiments of the display device(s) 106B included in the computing system 100B. That is, the actuator 204 included on each display device 106B is configured to receive commands and/or instructions from the processor 110C that enable and/or allow each respective actuator 204 to dynamically modify (change) the size and/or shape of its corresponding flexible screen 202B similar to the embodiments of the actuator 204 and the display device 106B discussed above with reference to FIGS. 1B and 2B.

Various embodiments of the processor 110C included in the computing system 100C and/or the information handling device 102C are configured to modify the size and/or the shape of one or more of the display devices 106A included on the information handling device 102C. In additional or alternative embodiments, the various embodiments of the processor 110C are configured to modify the size and/or the shape of one or more of the display devices 106B included in the computing system 100C and that are coupled to and/or couplable to the information handling device 102C.

Further, the processor 110C may be coupled to and/or couplable to the actuator 104 and is capable of transmitting a set of one or more commands and/or instructions to control an actuator 104 both when actually coupled to the actuator 104 and when couplable to (e.g., is capable of being coupled to and is not actually/currently coupled to) the actuator 104. As such, the term, "couplable," can include the processor 110C being actually coupled to the actuator 104 and/or is capable of being coupled to but is not actually/currently coupled to the actuator 104.

Further still, the processor 110C may be coupled to and/or couplable to each respective actuator 204 included in the display device(s) 106B and/or to each corresponding display device 106B. That is, processor 110C is capable of transmitting a set of one or more commands and/or instructions to control an actuator 204 both when actually coupled to the actuator 204 and/or the corresponding display device 106B and when couplable to (e.g., is capable of being coupled to and is not actually/currently coupled to) the actuator 204 and/or the corresponding display device 106B. As such, the term, "couplable," can include the processor 110C being actually coupled to the actuator 204 and/or the corresponding display device 106B and/or is capable of being coupled to the actuator 204 and/or the corresponding display device 106B but is not actually/currently coupled to the actuator 204 and/or the corresponding display device 106B.

As discussed above, the various embodiments of the screen buffer 112C included in the information handling device 100C include hardware and/or software and perform a set of one or more operations/functions similar to the various embodiments of the screen buffer(s) 112A and/or 112B included in the information handling device 100A and/or 100B. That is, various embodiment of the screen buffer 112C are configured to modify the data and/or content being displayed on the flexible screen 202A of an internal display device 106A in response to the size and/or shape of the flexible screen 202A on the internal display device 106A being modified and/or modify the data and/or content being displayed on the flexible screen 202B of an external display device 106B in response to the size and/or shape of the flexible screen 202B on the external display device 106B being modified.

Figure 5:
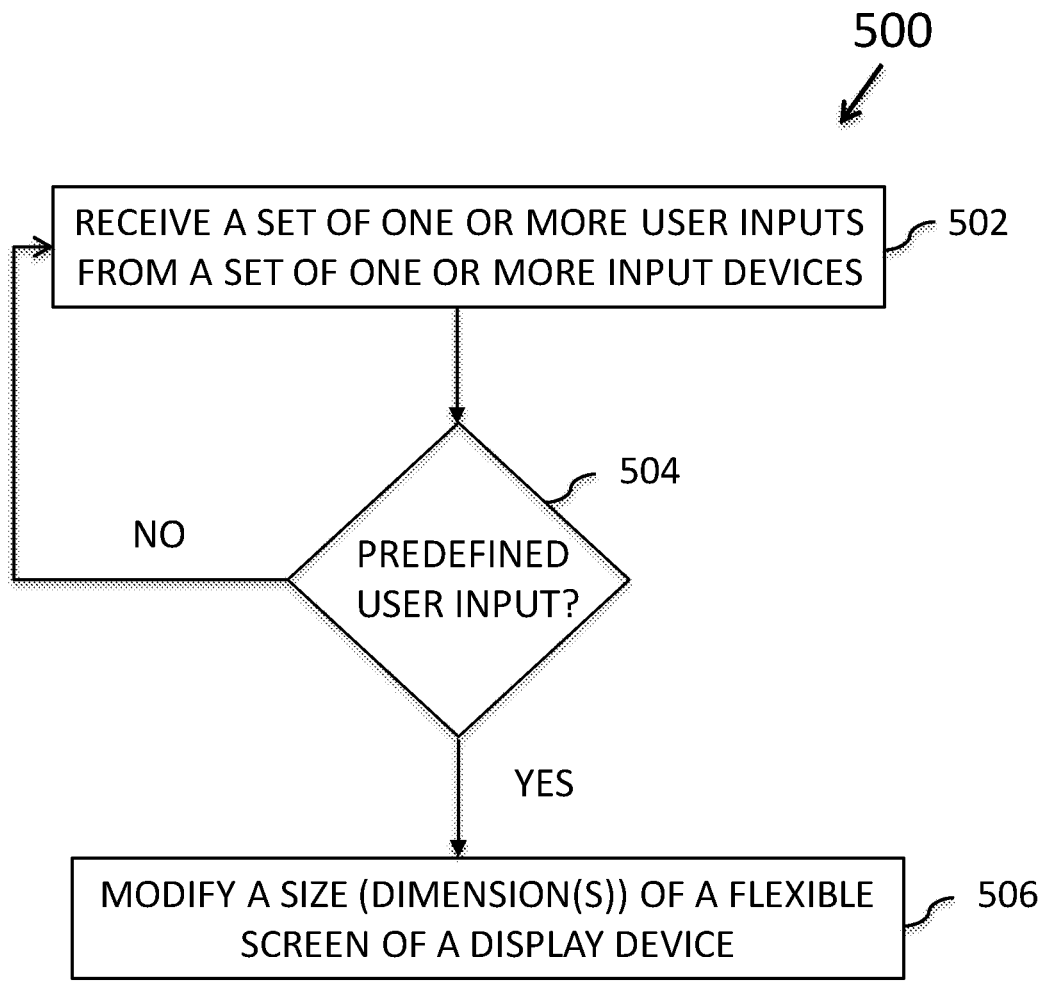
FIG. 5 is a schematic flow chart diagram illustrating one embodiment of a method for modifying a size (dimension(s)) of a computing display screen.

FIG. 5 is a schematic flow chart diagram illustrating one embodiment of a method 500 for modifying a size (dimension(s)) of a flexible screen of a display device (e.g., flexible screen 202A of a display device 106A or flexible screen 202B of a display device 202B). At least in the illustrated embodiment, the method 500 begins by a processor 110 receiving a set of one or more user inputs from one or more input devices 116 (block 502).

The processor 110 determines if/whether the user input(s) include a predefined user input (block 504). In response to the user input(s) not including a predefined user input (e.g., a "NO" in block 504), the processor 110 continues to receive sets of one or more user inputs from one or more input devices 116 (block 502).

In response to the user input(s) including a predefined user input (e.g., a "YES" in block 504), the processor 110 modifies a size (dimension(s)) of a flexible screen of a display device (e.g., flexible screen 202A of a display device 106A or flexible screen 202B of a display device 202B) (block 506). The processor 110 may make any suitable modification to the size and/or dimension(s) of any one or more sections, one or more sides, and/or portions of the perimeter of the flexible screen 202A or 202B, as discussed elsewhere herein.

Figure 6:
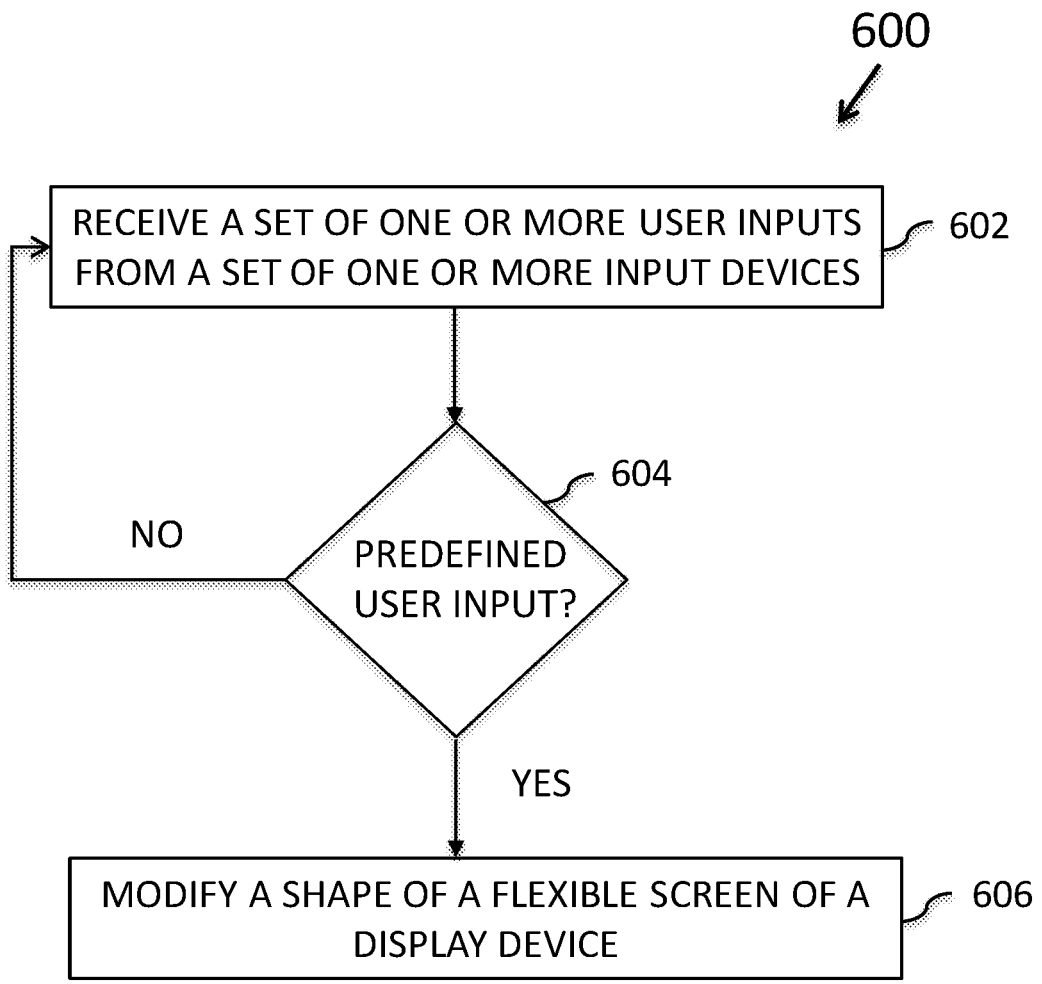
FIG. 6 is a schematic flow chart diagram illustrating another embodiment of a method for modifying a shape of a computing display screen.

FIG. 6 is a schematic flow chart diagram illustrating one embodiment of a method 600 for modifying a shape of a flexible screen of a display device (e.g., flexible screen 202A of a display device 106A or flexible screen 202B of a display device 202B). At least in the illustrated embodiment, the method 600 begins by a processor 110 receiving a set of one or more user inputs from one or more input devices 116 (block 602).

The processor 110 determines if/whether the user input(s) include a predefined user input (block 604). In response to the user input(s) not including a predefined user input (e.g., a "NO" in block 604), the processor 110 continues to receive sets of one or more user inputs from one or more input devices 116 (block 602).

In response to the user input(s) including a predefined user input (e.g., a "YES" in block 604), the processor 110 modifies the shape of a flexible screen of a display device (e.g., flexible screen 202A of a display device 106A or flexible screen 202B of a display device 202B) (block 606). The processor 110 may make any suitable modification to the shape of the flexible screen 202A or 202B, as discussed elsewhere herein.

Figure 7:
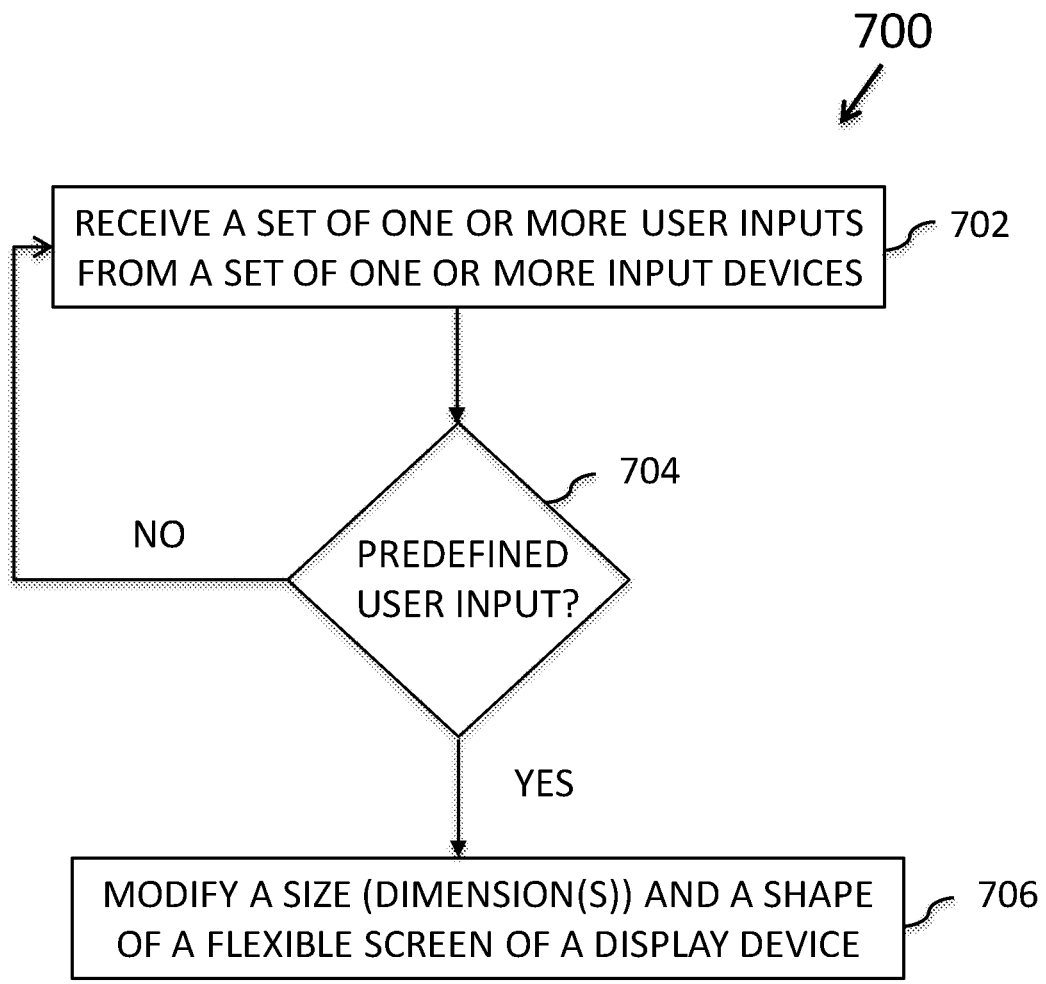
FIG. 7 is a schematic flow chart diagram illustrating yet another embodiment of a method for modifying a size (dimension(s)) and a shape of a computing display screen.

FIG. 7 is a schematic flow chart diagram illustrating one embodiment of a method 700 for modifying a size (dimension(s)) and a shape of a flexible screen of a display device (e.g., flexible screen 202A of a display device 106A or flexible screen 202B of a display device 202B). At least in the illustrated embodiment, the method 700 begins by a processor 110 receiving a set of one or more user inputs from one or more input devices 116 (block 702).

The processor 110 determines if/whether the user input(s) include a predefined user input (block 704). In response to the user input(s) not including a predefined user input (e.g., a "NO" in block 704), the processor 110 continues to receive sets of one or more user inputs from one or more input devices 116 (block 702).

In response to the user input(s) including a predefined user input (e.g., a "YES" in block 704), the processor 110 modifies a size (dimension(s)) and a shape of a flexible screen of a display device (e.g., flexible screen 202A of a display device 106A or flexible screen 202B of a display device 202B) (block 706). The processor 110 may make any suitable modification to the size and/or dimension(s) of any one or more sections, one or more sides, and/or portions of the perimeter of the flexible screen 202A or 202B and any suitable modification to the shape of the flexible screen 202A or 202B, as discussed elsewhere herein.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
a processor couplable to a flexible display screen of a computing device, the flexible display screen including a physical size and a physical shape; and
a memory configured to store code executable by the processor to:
receive an input from a user,
determine if the input is a predefined input, and
modify, by a hardware actuator applying a mechanical force to the flexible display screen, one of the physical size or the physical shape of the flexible display screen by expanding or contracting one or more portions of the flexible display screen in response to the input being the predefined input.

2. The apparatus of claim 1, wherein the code is executable by the processor to further modify the other one of the physical size or the physical shape of the flexible display screen in response to the input being the predefined input.

3. The apparatus of claim 1, wherein:
the predefined input is a first predefined input;
the code is executable by the processor to modify the one of the physical size or the physical shape of the flexible display screen in response to the first predefined input; and
the code is executable by the processor to further cause the processor to:
receive a second input from the user,
determine if the second input is a second predetermined input, and
modify the other one of the physical size or the physical shape of the flexible display screen in response to the second input being the second predefined input.

4. The apparatus of claim 1, wherein the user input comprises one of a keystroke on a keyboard, a mouse input on a mouse, a touch input on a touch pad, a gesture, and a voice command.

5. The apparatus of claim 1, wherein:
the flexible display screen comprises a touchscreen; and
the user input comprises a touch input on the touch screen.

6. The apparatus of claim 1, wherein the user input comprises an input to an application modifying one of:
a size of an application displayed on the flexible display screen; and
a shape of the application displayed on the flexible display screen.

7. The apparatus of claim 1, wherein the user input comprises an input to an application displayed on the flexible display screen modifying a size and a shape of the application.

8. A method, comprising:
receiving, by a processor couplable to a flexible display screen of a computing device, the flexible display screen including a physical size and a physical shape, an input from a user;
determining if the input is a predefined input; and
modifying, by a hardware actuator applying a mechanical force to the flexible display screen, one of the physical size or the physical shape of the flexible display screen by expanding or contracting one or more portions of the flexible display screen in response to the input being the predefined input.

9. The method of claim 8, further comprising modifying the other one of the physical size or the physical shape of the flexible display screen in response to the input being the predefined input.

10. The method of claim 8, wherein:
the predefined input is a first predefined input;
the one of the physical size or the physical shape of the flexible display screen is modified in response to the first predefined input; and
the method further comprising:
receiving a second input from the user,
determining if the second input is a second predetermined input, and
modifying the other one of the physical size or the physical shape of the flexible display screen in response to the second input being the second predefined input.

11. The method of claim 8, wherein the user input comprises one of a keystroke on a keyboard, a mouse input on a mouse, a touch input on a touch pad, a gesture, and a voice command.

12. The method of claim 8, wherein:
the flexible display screen comprises a touchscreen; and
the user input comprises a touch input on the touch screen.

13. The method of claim 8, wherein the user input comprises an input to an application modifying one of:
a size of an application; and
a shape of the application.

14. The method of claim 8, wherein the user input comprises an input to an application displayed on the flexible display screen modifying a size and a shape of the application.

15. A computer program product comprising a non-transitory computer-readable storage medium configured to store code executable by a processor couplable to a flexible display screen of a computing device, the flexible display screen including a physical size and a physical shape, the executable code comprising code to perform:
receiving an input from a user;
determining if the input is a predefined input; and
modifying, by a hardware actuator applying a mechanical force to the flexible display screen, one of the physical size or the physical shape of the flexible display screen by expanding or contracting one or more portions of the flexible display screen in response to the input being the predefined input.

16. The computer program product of claim 15, wherein the executable code further comprises code to perform modifying the other one of the physical size or the physical shape of the flexible display screen in response to the input being the predefined input.

17. The computer program product of claim 15, wherein:
the predefined input is a first predefined input;
the one of the physical size or the physical shape of the flexible display screen is modified in response to the first predefined input; and
the executable code further comprises code to perform:
receiving a second input from the user,
determining if the second input is a second predetermined input, and
modifying the other one of the physical size or the physical shape of the flexible display screen in response to the second input being the second predefined input.

18. The computer program product of claim 15, wherein the user input comprises one of a keystroke on a keyboard, a mouse input on a mouse, a touch input on a touch pad, a gesture, and a voice command.

19. The computer program product of claim 15, wherein:
the flexible display screen comprises a touchscreen; and
the user input comprises a touch input on the touch screen.

20. The computer program product of claim 15, wherein the user input comprises an input to an application modifying at least one of:
a size of an application; and
a shape of the application.

* * * * *